United States Patent [19]

Wentworth, Jr.

[11] Patent Number: 4,952,340
[45] Date of Patent: Aug. 28, 1990

[54] VIBRATORY ION VAPOR GENERATOR AND METHOD

[76] Inventor: Fred A. Wentworth, Jr., R.F.D. 4, 100 Brentwood Rd., Exeter, N.H. 03833

[21] Appl. No.: 445,457

[22] Filed: Dec. 4, 1989

[51] Int. Cl.⁵ .............................................. B01F 3/04
[52] U.S. Cl. ........................................ 261/30; 261/81
[58] Field of Search ............................. 261/81, 24, 30

[56] References Cited

U.S. PATENT DOCUMENTS

| | | |
|---|---|---|
| D. 235,448 | 6/1975 | Wentworth, Jr. . |
| D. 253,907 | 1/1980 | Wentworth, Jr. et al. . |
| 2,420,691 | 5/1947 | Vang .................................... 261/81 |
| 3,862,819 | 1/1975 | Wentworth, Jr. . |
| 4,016,837 | 4/1977 | Wentworth, Jr. . |
| 4,257,989 | 3/1981 | Nishikawa ......................... 261/81 |
| 4,410,467 | 10/1983 | Wentworth, Jr. . |
| 4,673,656 | 6/1987 | Pink .................................... 261/81 |
| 4,731,204 | 3/1988 | Norma et al. ...................... 261/81 |
| 4,776,990 | 10/1988 | Verity ................................. 261/81 |

Primary Examiner—Tim Miles
Attorney, Agent, or Firm—Hayes, Soloway, Hennessey & Hage

[57] ABSTRACT

Apparatus of the invention agitates the surface of a dielectric liquid including $H_2O$ to produce a vapor of excess negative ions. The ion vapor can be utilized for the enhancement of combustion processes. By supplying this excess ion vapor to a combustion region of heating furnaces and internal combustion engines, a catalytic reaction is produced that can reduce fuel consumption and reduce undesired exhaust emissions. The negative ion vapor of the invention can also be supplied to a enclosed area occupied by humans to reduce many noxious odors and breathing irritants.

19 Claims, 3 Drawing Sheets

U.S. Patent   Aug. 28, 1990   Sheet 3 of 3   4,952,340
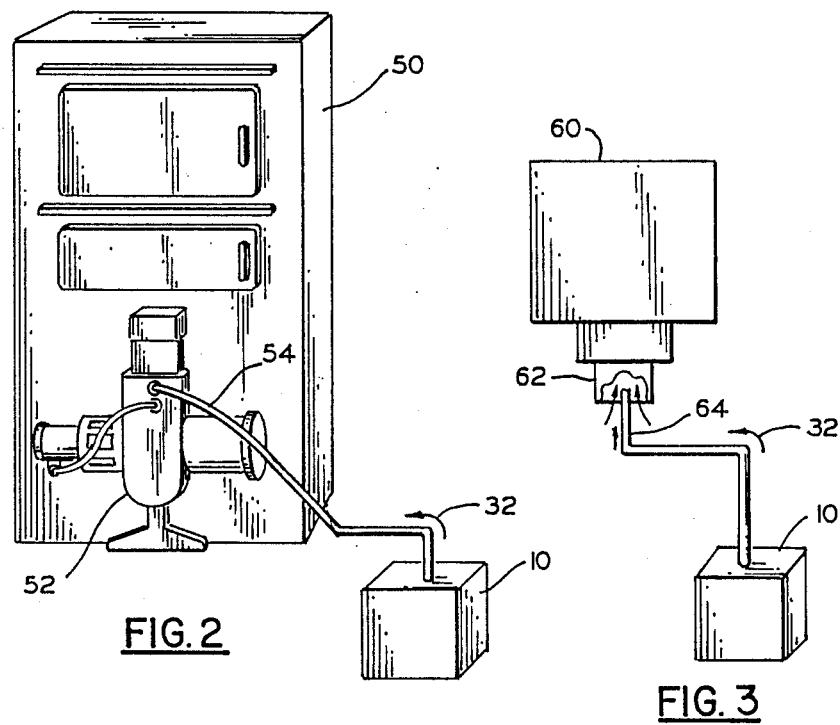
FIG. 2
FIG. 3
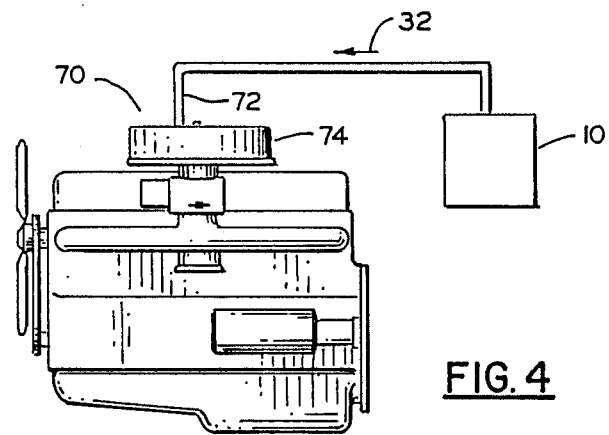
FIG. 4

VIBRATORY ION VAPOR GENERATOR AND METHOD

BACKGROUND OF THE INVENTION:

1. Field of the Invention.

The present invention relates to ion vapor generation and to improved devices for generating ion vapors. The invention has particular utility in combustion enhancement of furnaces using oil, gas, coal, wood and the like fuels, and to combustion enhancement of internal combustion engines using gasoline, diesel oil and/or LNG, propane or butane gas and the like fuels, and will be described in connection with such utility, although other utilities including, for example, the field of health for control of infectious airborne contaminants, irritants to breathing and odors in the air are contemplated.

2. Description of the Prior Art.

The presence of measurable amounts of water vapor is known to have a catalytic effect on improving the efficiency of fuel consumption in various combustion processes as is described in Van Nostrand's Scientific Encyclopedia, Fourth Edition, at page 1501. For many years, bubbling vapor generators have been applied successfully on internal combustion engines. During the last several years improvements have been made in bubbling vapor generators for heating apparatus and related combustion furnace applications. The precise phenomenology by which negative ions enhanced combustion has not been fully understood. Further, the mechanism by which negative ions are liberated from a liquid including $H_2O$, and why the bubbling process functioned better than other methods, is still unknown. However, numerous tests and commercial use of the inventor's earlier bubbling ion vapor generator, has demonstrated the benefits of the presence of a source of negative ion vapor to combustion processes. A research report of the inventor's prior bubble ion vapor technology is given in Nelson, K. L. et al, "Augmentation of Gas-Phase Combustion by Bubbling Combustion Air Through Air", *Proceedings of Alternative Energy Sources IV; Hydrocarbon Technology Environment (Ann Arbor, Mich.)*, Vol 6, 1982, pp 273-289. See also Applicant's prior U.S. Pat. Nos. 3,862,819, 4,016,837 and 4,410,467. Further, the beneficial reduction of odors in the air and reduction of airborne irritants to breathing have been experienced by such use. Confirmation of the benefits derived from negative ion vapor to several human health related areas, such as retarding the presence of bacteria and resulting infection, is documented in Soyka, Fred et al *The Ion Effect;* NY, Bantam Books, 1977, with additional references given in the bibliography.

SUMMARY OF INVENTION

The present invention provides an improved Ion Vapor Generator for producing a quantity of electrically charged negative ions, and comprising, in combination, a container for holding a liquid including $H_2O$, having a head space adapted to accumulate ion vapors generated; means for controllably agitating the surface of the liquid held in the container whereby substantially to maintain continuous surface tension of the liquid; means for withdrawing ion-enriched vapor from the container head, an outlet for withdrawing ion-enriched vapor from said container, and air pressure equalization means for equalizing air pressure within said container. In a preferred embodiment of the invention, the ion vapor generator includes recirculating means for concentrating ion-enriched vapors and comprising a vibratory air pump which is mounted directly to said container whereby to perform the dual functions of imparting vibration to the container and resultant agitation of the liquid surface and vapor recirculating.

For the further understanding of the present invention, reference should be had to the following detailed description taken in connection with the accompanying drawings wherein:

BRIEF DESCRIPTION OF DRAWINGS:

FIG. 2 illustrates the installation of an ion generator of the present invention with an oil burning heating furnace;

FIG. 3 illustrates the installation of an ion generator of the present invention with a gas fueled heating furnace; and FIG. 4 illustrates the installation of an ion generator of the present invention on an internal combustion engine.

DESCRIPTION OF PREFERRED EMBODIMENTS

Figure 1B:
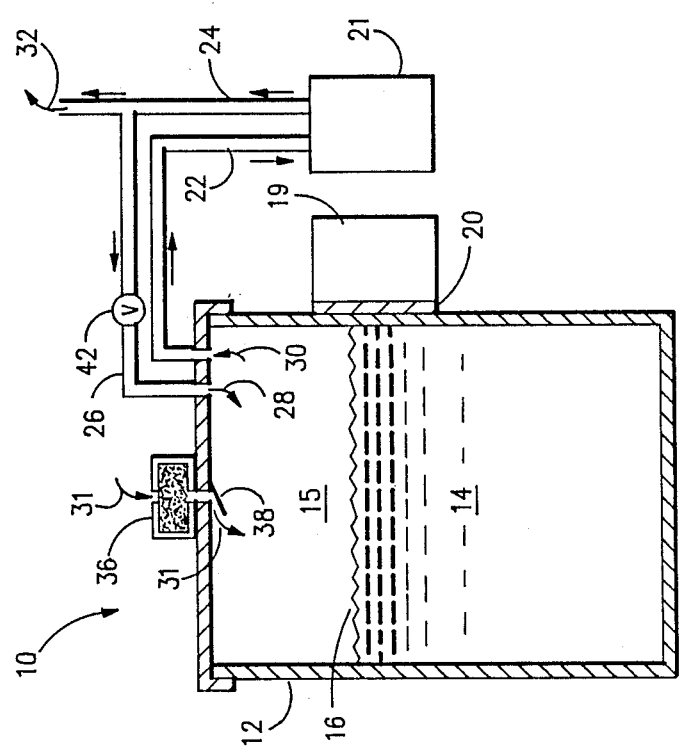
FIG. 1b is a schematic view in cross section of a second embodiment of vibration ion generator device made in accordance with the present invention.
Figure 1A:
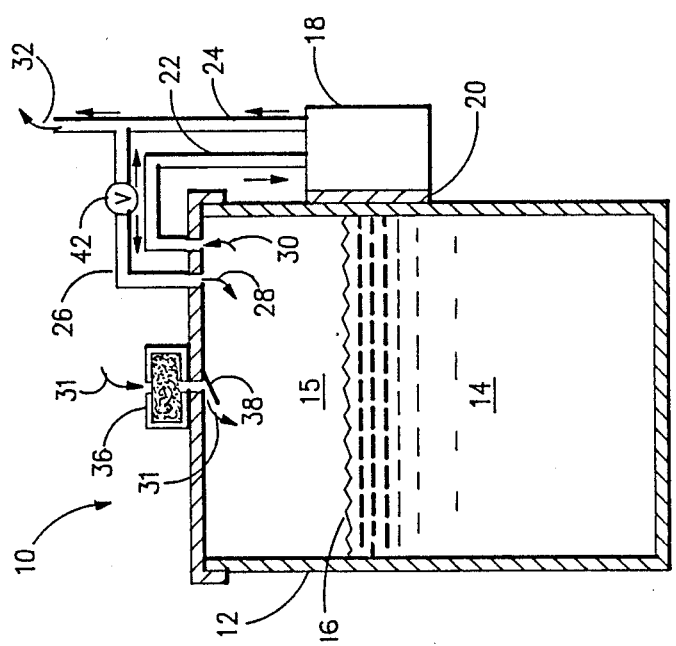
FIG. 1a is a schematic view, in cross section of one embodiment of vibration ion generator device made in accordance with the present invention.

FIG. 1a details a preferred embodiment of Vibratory Ion Vapor Generator 10 made in accordance with the present invention. It consists of a liquid container 12 partially filled with a liquid 14 containing $H_2O$. The head space volume 15 above the liquid surface 16 is where the primary negative ion vapor accumulates after liberation from the liquid. A combination vibrator and air pump 18 is mechanically coupled 20 to the side wall of the liquid container 12. The liquid surface 16 is caused to be agitated with a resulting rippling effect as caused by the vibrator unit 18 when operating. The vibratory levels, frequency and amplitude, must be adjusted so as substantially to maintain continuous surface tension on the liquid surface. This agitation causes negative ions to be released from the liquid 14 and out through the liquid surface 16. Elevated levels of surface agitation that lead to substantial disruption of the surface tension will (1) significantly limit the effective generation of negative ions and/or (2) cause undesired levels of positive ions to be generated in place of negative ions, defeating the purpose of the negative ion generator.

The air pump portion of the vibrator unit 18 recirculates the ion vapor in the volume 15 by drawing the vapor 30 into the pump inlet 22 and returning it to the volume 15 via the pump outlet 24 and the vapor return 26 to the exit 28. A portion of the ion vapor flow exiting the pump 18 via the air pump outlet 24 is caused to flow out through conduit 27, the ion vapor 32 being directed to the combustion process or other process. The portion of the ion vapor in 24 caused to divide and flow through 26 and 27 is controlled by the adjustment of vapor flow valve 42. The valve 42 can be replaced with a fixed restrictive orifice means where adjustment is not required. Ambient air 31 is drawn in through filter 36 and into the volume 15 to replace that directed to a combustion process or other application 32. A one-way flow control valve 38 to prevent backflow is optional and may be desirable in some applications.

A variation of the ion vapor generator 10 made in accordance with the present invention is shown in FIG. 1b. Here the vibration means 19 used to agitate the liquid surface 16 is separate from the air pump device 21. The vibrator 19 is mechanically coupled 20 to the liquid container 12, while the air pump 21 is located and powered separately. An alternative arrangement is to introduce the vibratory means 19 directly into and submerged in the liquid 14 within the container 12, or applying any other functionally equivalent means for vibratory agitation of the liquid surface 16.

Figure 1D:
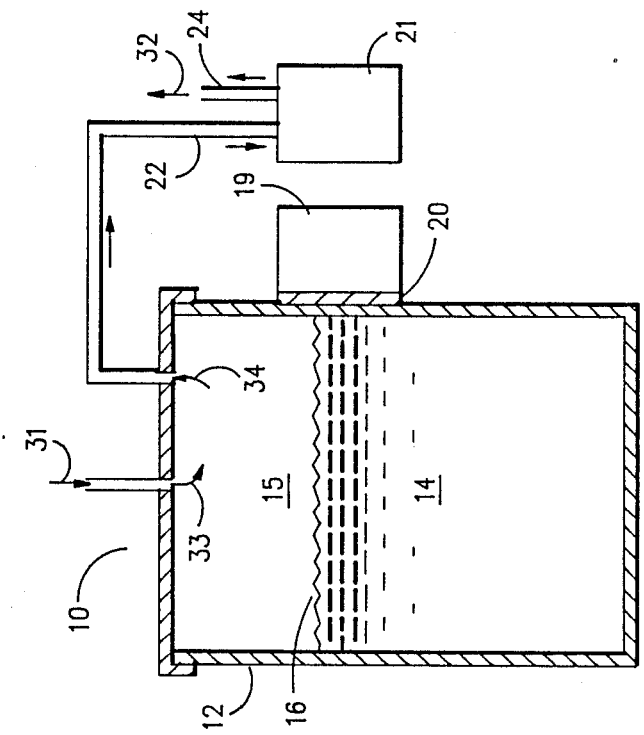
FIG. 1d is a schematic view in cross section of a fourth embodiment of vibration ion generator device made in accordance with the present invention.
Figure 1C:
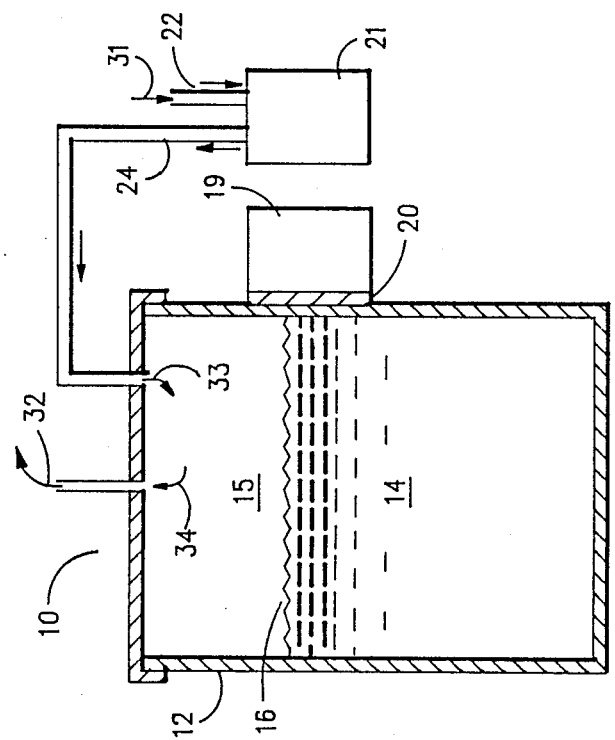
FIG. 1c is a schematic view, in cross section of a third embodiment of vibration ion generator device made in accordance with the present invention.

A third embodiment of Vibratory Ion Vapor Generator 10 is shown in FIG. 1c. Ambient air 31 is drawn into the air pump 21 air inlet 22 and introduced to the generator 10 at point 33, via an air pump outlet 24. The ion vapor 32 is removed from the generator 10 at point 34.

A fourth embodiment of Vibratory Ion Vapor Generator 10 is shown in FIG. 1d. Ambient air 31 is drawn into the generator 10 at point 33. Ion vapor 32 is drawn out of the generator 10 at point 34 by air pump 21 at air pump inlet 22, and directed at the air pump outlet 24 to the point of application.

For application of the ion generator invention 10 to odor control in a room or contaminants to breathing, the negative ion outflow 32 is directed through ion vapor feed 31 to the area requiring ion treatment.

The application of the negative ion vapor generator of the present invention to an oil fueled furnace 50 is shown in FIG. 2. A negative ion vapor generator 10 supplies a source of ions 32 which are transported via a feed line 54 to the oil burner and combustion region 52 of the furnace 50. Similar furnaces fueled with gas, coal, wood or the like are connected to the ion vapor generator 10 by an ion vapor feed line 54.

The application of the negative ion vapor generator of the present invention to a gas fired burner unit 60 is shown in FIG. 3. A negative ion vapor generator 10 supplies a source of ion vapor 32 via a feed line 64 to the gas burner combustion region 62.

The application of the negative ion vapor generator of the present invention 10 to an internal combustion engine 70, is illustrated in FIG. 4. Here the ion vapor 32 is feed to the engine via the ion vapor feed line 72. The ion vapor 32 is directed into the engine air intake 74 and enters the engine combustion area along with the normal intake air. The engine may be the type fueled with gasoline, diesel oil, LNG, propane, butane or the like fuels. The invention ion generator 10 may require an initial bypass valve 42 adjustment when installed with differently fueled engines or heating furnaces. Once installed, further adjustment will not be required unless the combustion process or other application is significantly altered.

The capacity requirements for optimum performance of the negative ion vapor generator 10 is determined by the general combustion process or other requirements of the application to which it is applied.

The following examples illustrate advantages of the present invention. Vibratory Ion Generators were assembled in accordance with FIG. 1A.

EXAMPLE I

The container comprised a one gallon plastic jar which was half filled with distilled water. An air pump (Model Hartz 83833, 110 VAC available from Hartz Mountain Corporation, Harrison, N.J.) was used to circulate overheads in the container and to impart vibratory energy to the wall of the container which in turn caused vibrations in the water. The air pump operated at frequency of 60 Hz and an amplitude of approximately 0.03–0.06 inches. Ion laden overhead vapors were withdrawn from the container at a rate of 3,500 cc. per minute.

The resulting Vibratory Ion Vapor Generator was evaluated and its performance confirmed for room odor control in six (6) separate test sites. The performance exceeded that achieved with the inventor's previous bubble ion generators for reduction and elimination of noxious odors and cigarette smoke.

EXAMPLE II

A second series of tests were performed with the invention on internal combustion engines. The first automobile was a 1984 Ford with a V6 3.8L gasoline engine. The ion vapor generator had a one (1) quart liquid volume. It was filled halfway with distilled $H_2O$. The vibrator and air pump were a combined unit, with a vibration frequency of approximately 60 Hz. Bench testing of the ion vapor generator prior to installation on the automobile showed a ion electrical current of $10^{-12}$ to $10^{-11}$ ma. using a Keithley Model 610C electrometer. The unit was installed with the ion vapor being fed directly into the air intake filter assembly. Results of this test revealed an increase in gasoline miles per gallon of from 21 to 24, or about a 15% increase.

A second automobile, a 1983 Ford with a similar V6 3.8L gasoline engine, was outfitted with an identical Vibratory Ion Vapor Generator. Results of this test revealed essentially an identical increase in miles per gallon of from 21 to 24, or about a 15% increase.

It was found that the present invention, a Vibratory Ion Vapor Generator, produced an ample supply of negative ion vapor. In fact, the ion flow which represents an electrical current had increased by 2 or 3 orders of magnitude over the prior bubble units, which operated at approximately $10^{-14}$ ma. This permits a physically smaller and less expensive generator with a higher ion output to be substituted for the bubble units in similar applications. Furthermore, the present invention eliminates the need for adjustable flow control valves in the vapor lines as was typically required with prior bubble units. A one-way flow control valve to prevent an overpressure surge from a combustion region from entering the ion generator can be utilized. The vibratory units are self adjusting and do not require special calibration. Moreover, the performance of vibrating ion vapor generators made in accordance with the present invention equals or exceeds that of the prior bubble units, in addition to the other operational and manufacturing benefits noted for the present invention.

What is claimed is:

1. In an improved ion vapor generator device for creating a quantity of electrically charged negative ions, comprising
    (a) a container for holding a quantity of a liquid including $H_2O$ and including head space for ion vapor within said container and above said liquid surface;

(b) means for withdrawing at least a portion of said ion vapor from said container;

(c) air pressure equalization means communicating with said container; and (d) vibration means coupled to said liquid for imparting controlled agitation to said liquid surface and adjusted so as substantially to maintain continuous surface tension on the liquid surface.

2. The improved ion vapor generator of claim 1, and further including a flow control valve interjected in said outlet means, for recirculating a controllable portion of said withdrawn ion vapor back to said container.

3. The improved ion vapor generator of claim 1, wherein said means for withdrawing comprises an air pump.

4. The improved ion vapor generator of claim 3, wherein said vibration means and said air pump means are functionally combined in one device.

5. The improved ion vapor generator of claim 1, and including an air pump mechanically coupled to said container, wherein said air pump serves the dual purposes of imparting recirculation of said ion vapor and of agitating said liquid surface.

6. The ion vapor generator of claim 1, wherein said vibrator means is powered by AC or DC electricity.

7. The improved ion vapor generator of claim 1, wherein said liquid surface agitation means maintains a substantially unbroken surface tension condition across said liquid surface while inducing said agitation.

8. The ion vapor generator of claim 1, wherein said air pumping means is powered by AC or DC electricity.

9. A ion generator capable of producing a quantity of negative electrically charged ions comprising means for imparting agitation to the surface of a liquid including $H_2O$ within a container and adjusted so as substantially to maintain continuous surface tension on the liquid surface whereby to generate a vapor comprising negative electrically charged ions, and means for controllably withdrawing a flow of said ions from said container.

10. The ion generator of claim 9, wherein said agitation of said liquid surface maintains a substantially unbroken surface tension across said liquid surface while inducing said agitation.

11. A method of producing an excess over ambient concentrations of negative ions from a container partially filled with a liquid including $H_2O$, which comprises: imparting a controlled agitation to the surface of (a) imparting a controlled agitation to the surface of said liquid and adjusting said agitation so as substantially to maintain continuous surface tension on the liquid surface to produce and liberate a net surplus of said negatively charged ions;

(b) withdrawing at least a portion said ion vapor from above said liquid surface in said container and recirculating at least a portion of said withdrawn ion vapor to said container; and (c) withdrawing a portion of said vapor enriched with negative ions to a desired location.

12. The method of producing negative ions of claim 11, wherein the agitation of said liquid surface is maintained at levels which will sustain a substantially continuous surface tension condition across said liquid surface.

13. A method of improving quality of air which comprises treating said air with negative ions produced according to the method of claim 9.

14. A negative ion vapor generator device, comprising:

(a) a container with sealable cover;

(b) said container partially filled with a liquid containing $H_2O$;

(c) a means for controllably inducing a vibration to said liquid and adjusted so as substantially to maintain continuous surface tension on the liquid surface;

(d) said vibration of said liquid induces a controllable agitation of a liquid surface while sustaining a substantially continuous surface tension condition across said liquid surface;

(e) a first passage in said cover for admitting ambient air to said container; and (f) a second passage in said cover for controllably withdrawing an electrically negative charged ion vapor from said container.

15. A negative ion vapor generator as recited in claim 14, in which the vibratory means comprises a vibrator which is mechanically coupled to the liquid container whereby to transmit a controlled agitation of the liquid surface.

16. A negative ion vapor generator as recited in claim 14, in which the vibratory means comprises a vibrator located within said liquid container whereby to impart a controlled agitation of the liquid surface.

17. A negative ion vapor generator as recited in claim 14, in which the vibratory means comprises a vibratory air pump.

18. A negative ion vapor generator as recited in claim 14, and including an air pump for pumping ambient air into said liquid container, and for forcing said negatively charged ion vapor to controllably flow out of said ion generator.

19. A negative ion vapor generator as recited in claim 14, and including an air pump for suctioning ionized vapor from said vapor generator.

* * * * *

UNITED STATES PATENT AND TRADEMARK OFFICE
CERTIFICATE OF CORRECTION

PATENT NO. : 4,952,340

DATED : August 28, 1990

INVENTOR(S) : Fred A. Wentworth, Jr.

It is certified that error appears in the above-identified patent and that said Letters Patent is hereby corrected as shown below:

Column 5, line 48 (Claim 11), after the colon ":", the words "imparting a controlled agitation to the surface of" should be deleted.

Signed and Sealed this

Seventh Day of April, 1992

Attest:

HARRY F. MANBECK, JR.

Attesting Officer

Commissioner of Patents and Trademarks